US010633465B2

(12) United States Patent
Flood et al.

(10) Patent No.: US 10,633,465 B2
(45) Date of Patent: Apr. 28, 2020

(54) BLOCK COPOLYMERS HAVING SEMI-CRYSTALLINE BLOCKS AND COMPOSITIONS AND ARTICLES MADE THEREFROM

(71) Applicant: KRATON POLYMERS U.S. LLC, Houston, TX (US)

(72) Inventors: John E. Flood, Houston, TX (US); Carl L. Willis, Houston, TX (US); Robert C. Bening, Houston, TX (US); Hendrik De Groot, Mont St. Guibert (BE); Xavier D. D. J. Muyldermans, Mont St. Guibert (BE); David T. Williamson, Landenberg, PA (US); Dale L. Handlin, Jr., Charlotte, NC (US); Robert Dossett, Cypress, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 267 days.

(21) Appl. No.: 15/466,207

(22) Filed: Mar. 22, 2017

(65) Prior Publication Data
US 2017/0275392 A1 Sep. 28, 2017

Related U.S. Application Data

(60) Provisional application No. 62/312,743, filed on Mar. 24, 2016.

(51) Int. Cl.
| | |
|---|---|
| *C08F 8/04* | (2006.01) |
| *C08F 297/04* | (2006.01) |
| *C08L 23/08* | (2006.01) |
| *C08J 5/18* | (2006.01) |
| *C08L 23/06* | (2006.01) |
| *C08L 23/14* | (2006.01) |
| *C08L 53/02* | (2006.01) |

(52) U.S. Cl.
CPC ............ *C08F 8/04* (2013.01); *C08F 297/044* (2013.01); *C08J 5/18* (2013.01); *C08L 23/06* (2013.01); *C08L 23/0815* (2013.01); *C08L 23/14* (2013.01); *C08J 2353/02* (2013.01); *C08J 2423/06* (2013.01); *C08L 53/025* (2013.01); *C08L 2205/02* (2013.01); *C08L 2205/03* (2013.01); *C08L 2207/066* (2013.01)

(58) Field of Classification Search
CPC . C08F 8/04; C08F 297/044; C08J 5/18; C08J 2353/02; C08L 23/06; C08L 23/14; C08L 53/025; C08L 23/0815
USPC ........................................................ 524/534
See application file for complete search history.

(56) References Cited

U.S. PATENT DOCUMENTS

| | | |
|---|---|---|
| RE27,145 E | 6/1971 | Jones |
| 3,595,942 A | 7/1971 | Wald et al. |
| 3,634,549 A | 1/1972 | Shaw et al. |
| 3,670,054 A | 6/1972 | De La Mare et al. |
| 3,700,633 A | 10/1972 | Wald et al. |
| 3,985,830 A | 10/1976 | Fetters et al. |
| 4,039,593 A | 8/1977 | Kamienski et al. |
| 4,089,913 A | 5/1978 | Miki et al. |
| 4,107,236 A | 8/1978 | Naylor et al. |
| 4,122,134 A | 10/1978 | Miki et al. |
| 4,237,245 A | 12/1980 | Halasa et al. |
| 4,252,914 A | 2/1981 | Halasa et al. |
| 4,391,949 A | 7/1983 | St. Clair |
| 4,436,873 A | 3/1984 | Furukawa et al. |
| 4,444,953 A | 4/1984 | St. Clair |
| 4,515,922 A | 5/1985 | Sakakibara et al. |
| 4,578,429 A | 3/1986 | Gergen |
| 4,882,384 A | 11/1989 | Willis et al. |
| 4,898,914 A | 2/1990 | Gergen et al. |
| 4,908,401 A | 3/1990 | Ohara et al. |
| 4,970,265 A | 11/1990 | Willis |
| 5,132,355 A | 7/1992 | Nahlovsky |
| 5,202,387 A | 4/1993 | Halasa et al. |
| 5,206,300 A | 4/1993 | Chamberlain |
| 5,216,074 A | 6/1993 | Imai et al. |
| 5,276,100 A | 1/1994 | Coolbaugh et al. |
| 5,276,101 A | 1/1994 | Chamberlain et al. |
| 5,506,299 A | 4/1996 | Gelles et al. |
| 5,516,831 A * | 5/1996 | Pottick ..................... C08K 5/01 524/474 |
| 5,783,302 A | 7/1998 | Bitler et al. |
| 5,885,908 A | 3/1999 | Jaeger et al. |

(Continued)

FOREIGN PATENT DOCUMENTS

| | | |
|---|---|---|
| CA | 716645 A | 8/1965 |
| CN | 1926183 | 3/2007 |

(Continued)

OTHER PUBLICATIONS

Bovey, F.A., High Resolution NMR of Macromolecules, Academic Press, New York and London, 1972, Chapter 6.

*Primary Examiner* — Hannah J Pak
(74) *Attorney, Agent, or Firm* — Ramesh Krishnamurti

(57) ABSTRACT

Selectively hydrogenated block copolymers having semi-crystalline blocks hard blocks and copolymer soft blocks having a combination of excellent physical properties and solvent resistance have been discovered. The block copolymer comprises at least one A block of hydrogenated, polymerized 1,3-butadiene and at least one B block which is a random copolymer or a controlled distribution copolymer of conjugated diene and mono vinyl aromatic monomers in which the conjugated diene monomer units are selectively hydrogenated. Polar functionalized block embodiments of the block copolymers are also disclosed. Compositions comprising the block copolymer and articles made from the block copolymer have also been discovered. A method is disclosed which provides highly isotropic, high strength melt cast films of block copolymers.

23 Claims, 1 Drawing Sheet

(56) References Cited

U.S. PATENT DOCUMENTS

| | | | |
|---|---|---|---|
| 6,703,449 B1 | 3/2004 | Hoxmeier et al. | |
| 7,169,848 B2 | 1/2007 | Bening et al. | |
| 7,186,779 B2 | 3/2007 | Joly et al. | |
| 7,582,702 B2 * | 9/2009 | Wright | C08F 8/04 524/505 |
| 7,852,702 B2 * | 12/2010 | Uetake | G11C 8/10 365/189.09 |
| 8,329,827 B2 * | 12/2012 | Willis | B01D 71/80 525/333.5 |
| 10,053,609 B2 * | 8/2018 | Bening | C08G 81/02 |
| 2004/0039128 A1 | 2/2004 | Sasagawa et al. | |
| 2007/0105986 A1 | 5/2007 | Kluttz et al. | |
| 2007/0264495 A1 | 11/2007 | Resmini et al. | |
| 2008/0188580 A1 | 8/2008 | Sasagawa et al. | |
| 2016/0362593 A1 * | 12/2016 | Bening | C08G 81/02 |

FOREIGN PATENT DOCUMENTS

| | | |
|---|---|---|
| EP | 0409580 B1 | 5/1995 |
| EP | 0676425 B1 | 9/1998 |
| EP | 1642928 A1 | 4/2006 |
| EP | 1702957 A1 | 9/2006 |
| EP | 1707596 A1 | 10/2006 |
| EP | 1690895 B1 | 3/2008 |
| EP | 1737908 B1 | 3/2008 |
| JP | 2007530746 A | 11/2007 |
| WO | WO2004/003027 A1 | 1/2004 |
| WO | 2005097887 A1 | 10/2005 |

* cited by examiner

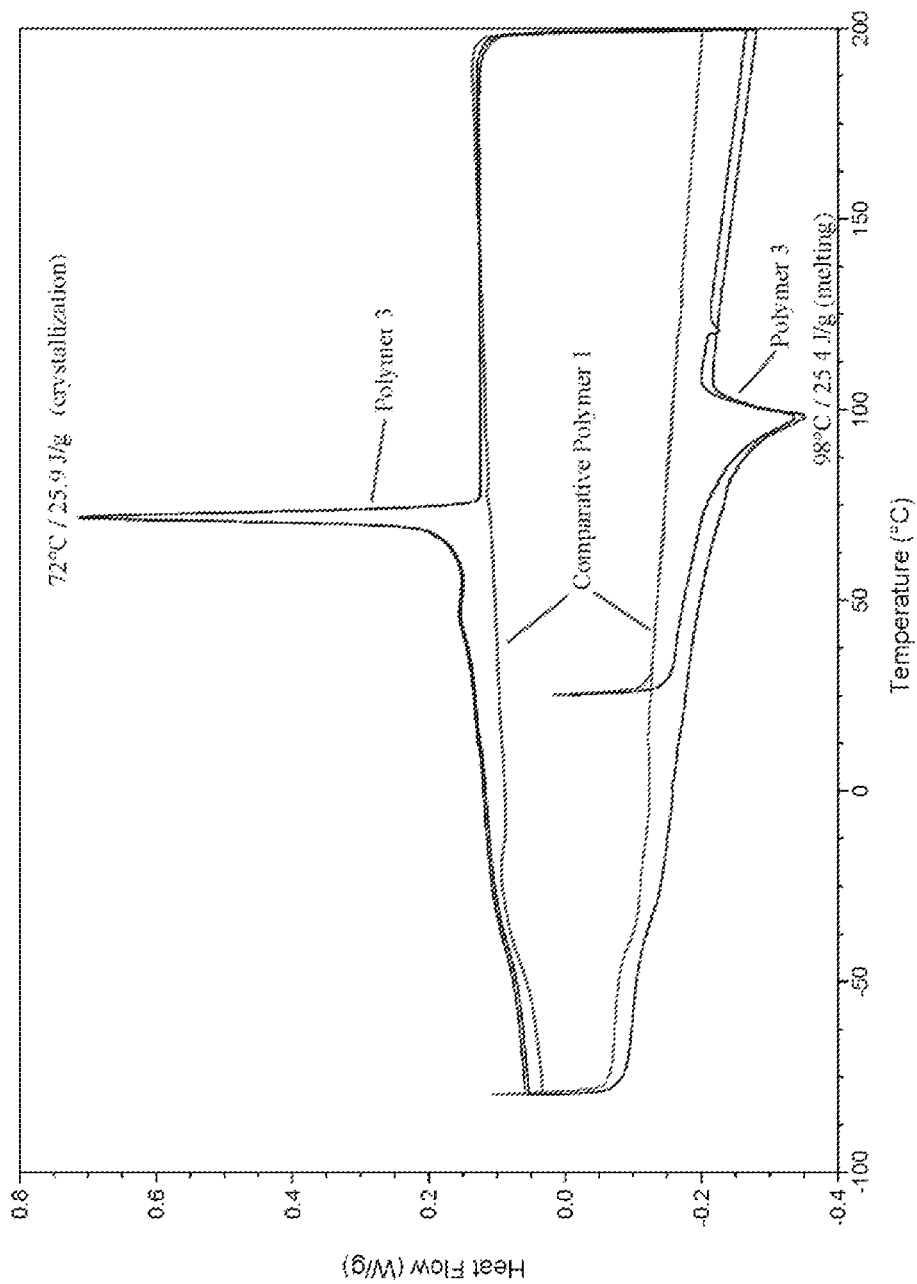

BLOCK COPOLYMERS HAVING SEMI-CRYSTALLINE BLOCKS AND COMPOSITIONS AND ARTICLES MADE THEREFROM

CROSS REFERENCE TO RELATED APPLICATIONS

This application claims priority to U.S. Provisional Application No. 62/312,743 filed Mar. 24, 2016, the entirety of which is incorporated herein by reference.

FIELD

The present disclosure is directed to a selectively hydrogenated, semi-crystalline block copolymer and to a method to produce highly isotropic, high strength melt cast films of block copolymers.

BACKGROUND

Block copolymers having semi-crystalline blocks have been disclosed in U.S. Pat. No. 3,670,054 to De La Mare et al. De La Mare et al. disclose linear pentablock copolymers which have semi-crystalline terminal blocks comprising hydrogenated vinyl content polybutadiene. The remaining blocks of the pentablock are homopolystyrene blocks and rubbery, hydrogenated, vinyl content polybutadiene or polyisoprene blocks. The reduced terminal block size and the chemical similarity of the terminal semi-crystalline blocks and the rubber conjugated diene blocks leads to a reduced tendency for these blocks to phase separate and thereby limits the development of superior physical properties.

U.S. Pat. No. 4,107,236 to Naylor et al. discloses block copolymers having semi-crystalline blocks derived from hydrogenated polybutadiene and lacking a mono vinyl aromatic block. In particular, these hydrogenated block copolymers possessed terminal semi-crystalline, hydrogenated, vinyl butadiene blocks and interior non-crystalline, hydrogenated, rubbery vinyl butadiene blocks. The tendency for phase separation of the terminal and interior blocks was much reduced in these block copolymers thereby limiting the development of superior physical properties.

Block copolymers having semi-crystalline blocks and hydrogenated, random styrene/butadiene blocks have been disclosed in U.S. Publication No. 2008/0188580, Sasagawa et al. To demonstrate flexibility and abrasion resistance the block copolymers of Sasagawa et al. had mono vinyl aromatic comonomer in their soft blocks. In particular, mono vinyl aromatic contents of 55 to 90% were disclosed. Further, physical properties were only demonstrated after peroxide cross-linking. Therefore, any physical cross-linking due to the semi-crystalline hard blocks was insufficient for producing materials having useful physical properties.

Block copolymers having selectively hydrogenated, controlled distribution soft blocks have been disclosed in U.S. Pat. No. 7,169,848 to Bening et al. The block copolymers did not possess semi-crystalline blocks. The presence of mono vinyl aromatic blocks, particularly polystyrene blocks, provided physical cross-linking and resulted in materials useful for a wide variety of applications. In particular, these materials had novel "stretching stiffness" character. The mono vinyl aromatic blocks were susceptible to attack by solvents and in such environments dissolved or achieved inferior physical properties.

There remains a need for thermo-processable rubber materials which are strong and solvent resistant. In particular, thermally processable block copolymers are desired which are easily melt processable while able to develop strength and solvent resistance in the solid state. This combination of strength and solvent resistance will allow practical application in a wide variety of environments in which they are exposed to some level of solvent vapor or liquid. Further, such block copolymers will be useful for the preparation of compositions in which solvent resistance, high processability, and strength are needed. In addition, there remains a need for highly isotropic elastomeric films. The present disclosure addresses these needs.

SUMMARY

The present disclosure provides a selectively hydrogenated, semi-crystalline block copolymer comprising at least one A block and at least one B block wherein the A block is a hydrogenated block of polymerized 1,3-butadiene having a vinyl content of 20% or less, and the B block is a copolymerized block of conjugated diene and mono vinyl aromatic monomer units wherein the total mono vinyl aromatic content of the block copolymer is from about 10 to about 55 wt. %.

In another aspect, there is provided a selectively hydrogenated block copolymer comprising at least one A block and at least one B block wherein the A block is a hydrogenated block of polymerized 1,3-butadiene having a vinyl content of 20% or less, and the B block is a controlled distribution copolymerized block of conjugated diene and mono vinyl aromatic monomer units wherein the conjugated diene monomer units are hydrogenated the amount of mono vinyl aromatic monomer is from about 10 wt. % to about 55 wt. %, and the mono vinyl aromatic blockiness is less than 40%. The selectively hydrogenated semi crystalline block copolymer presents a melting point characterized by a peak temperature superior to 50° C.

In still another aspect, the present disclosure provides a selectively hydrogenated, semi-crystalline block copolymer comprising at least one A block and at least one B block wherein the A block is a hydrogenated block of polymerized 1,3-butadiene having a vinyl content of 20% or less, and the B block is a random copolymerized block having a weight ratio of conjugated diene to mono vinyl aromatic monomer units from 90/10 to 60/40. The selectively hydrogenated semi crystalline block copolymer presents a melting point characterized by a peak temperature superior to 50° C.

In yet another aspect, the present disclosure provides a selectively hydrogenated, semi-crystalline block copolymer to which has been grafted polar functional groups in post-polymerization reactions. Such groups include maleic anhydride, maleic acid or fumaric acid and their derivatives, silicon or boron containing compounds, alkoxy silane compounds, ethylene oxide, carbon dioxide, alkali metal alkyl compounds, and sulfonic compounds.

The block copolymers described herein exhibit properties including high elasticity, tensile strength, and modulus while having high melt flow and processability even below 200° C. Importantly, the block copolymers show a significant degree of solvent resistance and have a low amount of extractable components due to chemical composition and their narrow molecular weight distributions resulting from their preparation by living anionic polymerization. The semi-crystalline nature of the block copolymers also imparts a non-sticky surface character to the block copolymers.

In a fourth aspect the disclosure provides a composition comprising the selectively hydrogenated block copolymer and at least one component selected from thermoplastic resins, tackifiers, plasticizers and waxes.

In another aspect, the disclosure provides an article comprising the selectively hydrogenated, semi-crystalline block copolymer which is a melt extruded or solvent cast film, coextruded multilayer films, melt blown films, melt blown multilayer films, an injection molded piece, a coating, a foamed shape, a fiber, a bicomponent, a multi-component fiber, a melt-blown fiber, a fibrous mat, a bundle of fibers, a powder, a gel of various shapes, extruded tubes, extruded profiles, injection molded pieces, a slush molded piece, or a rotationally molded piece.

In yet another aspect, the disclosure provides a novel method for producing highly isotropic, high strength films of melt cast block copolymers.

In the embodiments described herein, the semi-crystalline A blocks are similar to polyethylene blocks.

BRIEF DESCRIPTION OF THE FIGURES

FIG. 1 shows the DSC scans for Polymer 3 and Polymer 1.

DETAILED DESCRIPTION

The term "comprising" and derivatives thereof are not intended to exclude the presence of any additional component, step or procedure, whether or not the same is disclosed herein. In order to avoid any doubt, all compositions described and claimed herein through use of the term "comprising" may include any additional additive or compound, unless stated to the contrary. In contrast, the term, "consisting essentially of" if appearing herein, excludes from the scope of any succeeding recitation any other component, step or procedure, excepting those that are not essential to operability and the term "consisting of", if used, excludes any component, step or procedure not specifically delineated or listed.

The term "about" as used herein means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%.

ASTM D 1238 is entitled "Test Method for Melt Flow Rates of Thermoplastics by Extrusion Plastometer." The term "ASTM D 1238" as used herein refers to the standard test method for determining melt flow rates of thermoplastics by extrusion plastometer. In general, this test method covers the determination of the rate of extrusion of molten thermoplastic resins using an extrusion plastometer. After a specified preheating time, resin is extruded through a die with a specified length and orifice diameter under prescribed conditions of temperature, load, and piston position in the barrel. This test method was published Aug. 1, 2013, the contents of which are incorporated herein by reference in the entirety. For the referenced ASTM standards, visit the ASTM website, www.astm.org, or contact ASTM Customer Service at service@astm.org.

ASTM D 412 is entitled "Standard Test Methods for Vulcanized Rubber and Thermoplastic Elastomers—Tension." The term "ASTM D 412" as used herein refers to the standard test method for determining tensile properties of thermoplastics. In general, this test method covers the determination of modulus, tensile strength and elongation at break. The measurements and the test results were calculated in accordance with ASTM D 412. This test method was published Dec. 1, 2015, the contents of which are incorporated herein by reference in the entirety. For the referenced ASTM standards, visit the ASTM website, www.astm.org, or contact ASTM Customer Service at service@astm.org.

The polymers according to the embodiments presented herein can be made by any suitable method known to produce block copolymers having polyethylene-like blocks. Preferred are anionic polymerization methods. Anionic polymerization of monoalkenyl arenes and conjugated dienes with lithium initiators is well known as described in U.S. Pat. No. 4,039,593 and Re 27,145. Polymerization commences with monolithium, dilithium or polylithium initiators which build a living polymer backbone at each lithium site.

In general, the polymers useful in the context of the present disclosure may be prepared by contacting the monomer or monomers with an organoalkali metal compound in a suitable solvent at a temperature range of from −150° to 300° C., preferably at a temperature range of 0 to 100° C. Particularly effective polymerization initiators are organolithium compounds having the general formula RLi wherein R is an aliphatic, cycloaliphatic, or alkyl-substituted cycloaliphatic radical having from 1 to 20 carbon atoms. Suitable solvents include aliphatic hydrocarbons such as butane, pentane, hexane, heptanes or cyclohexane or cycloheptane, benzene, toluene and xylene and ethers such as tetrahydrofuran or diethylether.

Examples of suitable conjugated dienes include, but are not limited to, 1,3-butadiene (also referred to herein as "butadiene"), isoprene, piperylene, 1,3-hexadiene, myrcene, farnesene or a mixture thereof.

Examples of suitable mono vinyl aromatic monomers include but are not limited to styrene and substituted styrenes such as methylstyrene, p-tert-butylstyrene, dimethylstyrene, alpha-methylstyrene, diphenyl ethylenes and the like, including mixtures of these, but preferred is styrene. The total amount of mono vinyl aromatic monomer in the block copolymers is from 10 to 55 wt. % based upon the total monomer content of the block copolymer.

The conjugated diene monomers can be represented by $(C_1\!=\!C_2\!-\!C_3\!=\!C_4)$. Anionic polymerization of a conjugated diene may result in a polymer with all four of these carbons incorporated into the polymer backbone or, alternately, only two of these carbons ($C_1\!-\!C_2$ or $C_3\!-\!C_4$) incorporated into the polymer backbone. Incorporation of all four carbons in the polymer backbone occurs by way of 1,4-addition in the case of butadiene. Alternately, incorporation of only two carbons in the polymer backbone proceeds by 1,2-addition for butadiene. In the case of isoprene, incorporation of only two carbons in the polymer backbone proceeds by 3,4-addition. 1,2- or 3,4-addition of butadiene and isoprene, respectively, yields a group pendant to the polymer backbone and for the purposes of this disclosure is referred to as a vinyl group. Similarly, other conjugated dienes may polymerize in such a fashion as to yield pendant double bonds or vinyl groups. The amount of this vinyl group present in the conjugated diene block is referred to as vinyl content.

The amount of vinyl content in the A block ranges from 0 to 20 mol % of the polymerized monomers in the A block wherein the mol % is based upon the mol % of the total polymerized monomer content of the A block. At vinyl contents higher than 20 mol % the melting point of the A block is deleteriously decreased to below 50° C. In some embodiments, the vinyl content may range from 0 to 15 mol % based upon the mol % of the total monomer content of the A block. In other embodiments, the vinyl content may range from 0 to 10 mol % based upon the mol % of the total monomer content of the A block.

In one embodiment, the B block is a controlled distribution copolymer block. The controlled distribution of comonomers is neither random nor tapered. The combination of (1) a unique control for the comonomer addition and (2) the use of polar polymerization modifiers as a component of the solvent (which will be referred to as "distribution agents") results in characteristic distribution of the two monomers (herein termed a "controlled distribution" polymerization, i.e., a polymerization resulting in a "controlled distribution" structure), and also results in the presence of mono vinyl aromatic rich regions and conjugated diene rich regions in the copolymer block. For purposes hereof, "controlled distribution" refers to a molecular structure comprising an overall structure having relatively low blockiness. The blockiness of the controlled distribution ("B") blocks can be shown by either the presence of only a single ("Tg") intermediate between the Tg's of either monomer alone, when analyzed using differential scanning calorimetry ("DSC") (thermal) methods or via mechanical methods, or as shown via proton nuclear magnetic resonance ("H$^1$-NMR") methods. The potential for blockiness can also be inferred from measurement of the UV-visible absorbance in a wavelength range suitable for the detection of polystyryl-lithium end groups, for example when styrene is the mono vinyl aromatic comonomer, during the polymerization of the B block. An increase in this value is indicative of a substantial increase in polystyryllithium chain ends. In this process, this will only occur if the conjugated diene concentration drops below the critical level necessary to maintain controlled distribution polymerization. Any styrene monomer that is present at this point will add in a blocky fashion. The term "styrene blockiness", may be measured using proton NMR, and is defined to be the proportion of mono vinyl aromatic (S) units in the polymer having two S nearest neighbors on the polymer chain. The styrene blockiness is determined after using H$_1$-NMR to measure two experimental quantities as follows:

First, the total number of styrene units (i.e. arbitrary instrument units which cancel out when ratioed) is determined by integrating the total styrene aromatic signal in the H$_1$-NMR spectrum from 7.5 to 6.2 ppm and dividing this quantity by 5 to account for the 5 aromatic hydrogens on each styrene aromatic ring.

Second, the blocky styrene units are determined by integrating that portion of the aromatic signal in the H$_1$-NMR spectrum from the signal minimum between 6.88 and 6.80 to 6.2 ppm and dividing this quantity by 2 to account for the 2 ortho hydrogens on each blocky styrene aromatic ring. The assignment of this signal to the two ortho hydrogens on the rings of those styrene units which have two styrene nearest neighbors was reported in F. A. Bovey, High Resolution NMR of Macromolecules (Academic Press, New York and London, 1972), Chapter 6.

The styrene blockiness is simply the percentage of blocky styrene to total styrene units:

Blocky %=100 times(Blocky Styrene Units/Total Styrene Units)

Expressed thus, Polymer-Bd-S-(S)n-S-Bd-Polymer, where n is greater than zero is defined to be blocky styrene. For example, if n equals 8 in the example above, then the blockiness index would be 80%. It is preferred that the blockiness index be less than about 40. For some polymers having mono vinyl aromatic contents of 10 wt. % to 40 wt. % where the wt % is based on the total weight of the block polymer, it is preferred that the blockiness index be less than about 10.

When the B block is a controlled distribution block the amount of mono vinyl aromatic monomer ranges from 10 wt. % to 55 wt. % where the wt. % is based on the total weight of the B block. When the amount of mono vinyl aromatic monomer is less than 10 wt. % the strength of phase separation of the A and B blocks is not sufficiently strong to maintain physical strength and oil resistance in the solid state. When the amount of mono vinyl aromatic monomer is more than 55 wt. % then the rubbery character of the material is sacrificed. As such, the measurable total mono vinyl aromatic monomer content of the block copolymer will range from about 10 to about 55 wt. % wherein the wt % is based on the total weight of the block copolymer.

According to another embodiment, the B block is a random copolymer of conjugated diene and mono vinyl aromatic monomers. Methods for making such random copolymers are well known as disclosed in U.S. Pat. No. 4,089,913 to Miki et al. and U.S. Pat. No. 4,122,134 to Miki et al. Generally, such processes use a Lewis base randomizing agent during the living, anionic copolymerization step and/or continuously metered addition of comonomers. When the B block is a random copolymer it is particularly important to control the amount of mono vinyl aromatic monomer to maintain elastomeric properties. It is particularly important that the degree of randomness is such that the B block appear homogeneous. For instance, in dynamic mechanical analyses only a single glass transition is observed for this block. Separate Tgs may not be associated with conjugated diene or mono vinyl aromatic segments. When the B block is a random copolymer the ratio of mono vinyl aromatic monomer to conjugated diene is from 90/10 to 60/40. At higher mono vinyl aromatic monomer contents the copolymer is not sufficiently soft and elastic. At lower mono vinyl aromatic monomer contents the copolymer does not present a sufficient thermodynamic driving force for phase separation of the A and B block and deficient mechanical properties are achieved.

The A blocks have a molecular weight of greater than 10 kg/mol to 100 kg/mol, alternatively greater than 15 kg/mol to 80 kg/mol and more preferably 22 kg/mol to 50 kg/mol. The A block content in the total block copolymer is from 15 to 50 wt. % wherein wt. % is based on the total weight of the block copolymer. The preferred amount of the A block is from 20 to 45 wt. % and more preferred is 25 to 40 wt. % wherein wt. % is based on the total weight of the block copolymer. The B blocks have a molecular weight from 20 to 200 kg/mol and more preferably from 30 to 120 kg/mol. The B block content in the total block copolymer is from 40 to 80 wt. % wherein the wt. % is based on the total weight of the block copolymer. The preferred amount of the B block is from 50 to 80 wt % and more preferred is 60 to 75 wt. % wherein the wt. % is based on the total weight of the block copolymer.

The present disclosure further relates to block copolymers having at least one polymer block of polymerized 1,3-butadiene (A) and at least one selectively hydrogenated copolymer block of mono vinyl aromatic monomer and a conjugated diene (B) formed in diblock, triblock, radial or starblock structures. A triblock copolymer comprises two terminal polybutadiene blocks and one copolymer block. Such diblocks may be made by a sequential polymerization process in which the first step comprises polymerizing 1,3-butadiene with an organolithium initiator until polymerization of the 1,3-butadiene is substantially complete.

Then, in a second step a mono vinyl aromatic monomer and a conjugated diene monomer are copolymerized from the living polymer block of polybutadiene produced from the first step. Polymerization occurs spontaneously, and is allowed to proceed until substantially all the comonomers have polymerized to form a polybutadiene-poly(mono vinyl aromatic/conjugated diene) copolymer diblock. Living diblocks may be terminated to form a diblock product or may be reacted with a coupling agent to form radial or star block copolymer structures.

The A and B blocks may be adjacent or they may be separated by other blocks when the block copolymer structure is other than a diblock.

Preparation of radial, branched (sometimes referred to as "star" block copolymer) or linear coupled block copolymers requires a post-polymerization step called "coupling". For example, in the formula $(A-B)_n X$ for the radial block copolymer A is a block of polymerized 1,3-butadiene, B is copolymer block comprising a mono vinyl aromatic monomer and a conjugated diene monomer, where n is an integer ranging from 2 to about 30, preferably from about 2 to about 5, and X is the remnant or residue of a coupling agent. A-B block copolymers are formed by sequential polymerization as described above. Under suitable conditions, living diblock A-B copolymer "arms" are coupled together forming a triblock copolymer when "n" equals 2 (meaning 2 arms of diblock copolymers are coupled together) or a radial copolymer when "n" is greater than 2.

The embodiments described herein are not limited to symmetric, coupled block copolymers. The coupled arms may be identical resulting in symmetrical, coupled polymers or they may be different resulting in asymmetric, coupled polymers. In asymmetric embodiments some arms may contain no polybutadiene block or no copolymer block. Further, asymmetric, coupled block copolymers may contain arms in which the molecular weight of the A and B blocks, and the composition of the A and B block may vary.

In some embodiments described herein, the block copolymers have structures according to the following general formulae: A-B, $(A-B)_n X$, $(A-B)_n X-(A)_m$, or $(A-B)_n X-(B)_m$, wherein X is the residue of a coupling agent, n and m vary independently and are integers and range from 1 to 30, A represents polymer blocks of 1,3-butadiene, B represents copolymer blocks of conjugated diene and mono vinyl aromatic monomer units. In any coupled structure the composition and/or size of the (A-B) arms may vary independently. For example, one would understand the formula $(A-B)_n X$ to represent the possibility of coupling a mixture of (A-B), (A'-B), (A-B'), (A'B'), (A"-B), (A"-B'), (A-B"), (A'-B"), (A"-B"), etc. living arms where A, A' and A' have different sizes and B, B', and B" have different sizes and/or comonomer compositions or distributions. The preferred range of n is from 2 to 10 and the more preferred range is from 2 to 6. The preferred range of m is from 1 to 10 and the more preferred range is from 1 to 6. The block copolymer structures of the present disclosure are not limited to those listed here. A broad variety of arrangements of the blocks may be made by sequential and coupling polymerization procedures. The coupling process used to construct radial block copolymers is a statistical one and that n and m represent average values for the total collection of coupled molecules in any material.

Coupling agents may include, for example, dihalo alkanes, silicon halides, siloxanes, multifunctional epoxides, silica compounds, esters of monohydric alcohols with carboxylic acids, (e.g. dimethyl adipate) and epoxidized oils. Star-shaped polymers are prepared with polyalkenyl coupling agents as disclosed in, for example, U.S. Pat. Nos. 3,985,830; 4,391,949; and 4,444,953; and Canadian Patent No. 716,645. Suitable polyalkenyl coupling agents include divinylbenzene, and preferably m-divinylbenzene. Preferred are tetra-alkoxysilanes such as tetra-ethoxysilane (TEOS) and tetra-methoxysilane, alkyl-trialkoxysilanes such as methyl-trimethoxy silane (MTMS), aliphatic diesters such as dimethyl adipate and diethyl adipate, and diglycidyl aromatic epoxy compounds such as diglycidyl ethers deriving from the reaction of bis-phenol A and epichlorohydrin.

The coupling efficiency ("CE") depends on the structure desired and is defined as the proportion of polymer chain ends which are linked via the residue of the coupling agent at the completion of the coupling reaction to the total number of living, polymer-lithium chains at the end of polymerization and before coupling. The block copolymers described herein have a coupling efficiency of about 20 to 100%, including all points in-between. The preferred range of coupling efficiency is 70% or greater, more preferred is 80% or greater, and even more preferred is 90% or greater. In practice, GPC data is used to calculate the coupling efficiency for a polymer product.

Hydrogenation can be carried out via any of the several hydrogenation or selective hydrogenation processes known in the prior art. For example, hydrogenation may be accomplished using methods such as those disclosed in, for example, U.S. Pat. Nos. 3,595,942; 3,634,549; 3,670,054; 3,700,633; and Re. 27,145. These methods operate to hydrogenate polymers containing aromatic or ethylenic unsaturation and are based upon operation of a suitable catalyst. Such catalyst, or catalyst precursor, preferably comprises a Group VIII metal such as nickel or cobalt which is combined with a suitable reducing agent such as an aluminum alkyl or hydride of a metal selected from Groups I-A, II-A and III-B of the Periodic Table of the Elements, particularly lithium, magnesium or aluminum. This preparation can be accomplished in a suitable solvent or diluent at a temperature from about 20° C. to about 80° C. Other catalysts that are useful include titanium based catalyst systems.

High levels of hydrogenation of the conjugated diene, particularly in the A block, are desirable for the selective hydrogenation described herein, High levels of hydrogenation in the A block lead to high levels of crystallinity. Conversely, unhydrogenated conjugated diene units disrupt crystallinity in the A block. It is also desired that minimal levels of hydrogenation of the mono vinyl aromatic double bonds are realized. Reduction of the aromatic double bonds is expected to lead to an increased aliphatic character of the B block and a reduced driving force for phase separation of the A and B blocks. The phase separated character of the block copolymer, presented herein, in the solid state is essential for development of crystallinity, solvent resistance, and physical strength.

Selective hydrogenation is carried out under such conditions that 90 mol % or greater of the conjugated diene double bonds have been reduced, and between 0 and 10 mol % of the aromatic double bonds present in the polymerized mono vinyl aromatic units have been reduced. Preferred ranges are 95 mol % or greater of the conjugated diene double bonds reduced, and more preferably 97 mol % or greater of the conjugated diene double bonds are reduced, and most preferably 99 mol % or greater. In the preferred embodiments less than 5 mol % of the aromatic double bonds have been reduced and more preferably less than 1 mol % of the aromatic double bonds have been reduced.

The A block is a semi-crystalline block comprising hydrogenated polybutadiene and as such is the hard block in the block copolymer. Before hydrogenation it has a low vinyl content. The vinyl content in the A block is 20 mol % or less wherein the mol % is based on the total polymer content of the A block. Preferably, the vinyl content is 15 mol % or less and more preferably it is 10% or less wherein the mol % is based on the total polymer content of the A block. After hydrogenation the A block is crystallizable and has an observable melting point as measured by DSC. Further, the A block phase separates from the B block and it is the crystallization of the A blocks that gives the block copolymer its physical strength and resistance to solvents.

As described herein, the range of the melting point is from 50 to 120° C. In preferred embodiments the melting point is from 80 to 120° C., in more preferred embodiments from 90 to 120° C., and in most preferred embodiments from 105 to 120° C.

The B block comprises selectively hydrogenated polymerized conjugated diene monomer. However, the polymerization conditions used during formation of the B block lead to a relatively high vinyl content of the conjugated diene in this block. The vinyl content of the conjugated diene in the B blocks is 30% or greater. Preferably, the vinyl content in this block is from 30 to 90 mol %, more preferably from 30 to 55 mol %, and even more preferably from 30 to 50 mol %, wherein the mol % of the vinyl content is based on the mol % of the total monomer content of the B block. In addition to the vinyl content, the presence of the mono vinyl aromatic monomers further disrupts the formation of any crystallinity in the B block. Thus the B block is an essentially non-crystalline, soft, rubbery block. If there is any crystallinity present in the B block it will be present at less than 5 wt. % of the B block and will have melting points well under 50° C. In preferred embodiments the amount of crystallinity in the B block is less than 1 wt. % and any melting point observable by DSC will be less than 25° C.

In some embodiments of the present disclosure which are coupled a small amount of conjugated diene is added to the living chain before coupling in order to enhance the coupling reaction. The preferred conjugated diene for this enhancement is butadiene. The molecular weight of this additional block of conjugated diene is less than 10 kg/mol, preferably less than 5 kg/mol and even more preferably less than 1 kg/mol. The vinyl content of this block of conjugated diene is from 30 to 90 mol %, more preferably from 30 to 55 mol %, and even more preferably from 30 to 50 mol %.

One aspect of the present disclosure is a combination of facile processability in the melt state and physical properties of strength and solvent resistance in the solid state. Block copolymers generally develop strength in the solid state by phase separation of their distinct blocks. While phase separation is important in the solid state it can persist in the melt state and lead to high melt elasticities and low processability. The temperature at which the phase separation dissipates is the order-disorder transition temperature, or ODT. Above the ODT the block copolymer experiences a homogenous state and therefore low melt elasticities and good processability. High melt processability is desirable for the purposes of the present disclosure. To achieve the desired melt processability the ODT is preferably 150° C. or lower. When the ODT is higher than 150° C. the advantage of high processability at low melt temperatures is lost. In more preferred embodiments the ODT is 140° C. or less and in most preferred embodiments it is 130° C. or less. In some embodiments, the selectively hydrogenated, semi-crystalline block copolymer has the ODT from 50° C. to 150° C.

In some embodiments, the selectively hydrogenated, semi-crystalline block copolymer has the ODT from 75° C. to 120° C.

In some embodiments, the selectively hydrogenated, semi-crystalline block copolymer has a melt flow rate from 0.01 to 500 g/10 min as measured by ASTM D 1238 at 190° C./2.16 kg. In some embodiments, the selectively hydrogenated, semi-crystalline block copolymer has a melt flow rate ranging from 1 to 25 g/10 min as measured by ASTM D 1238 at 190 C/2.16 kg. In some embodiments, the selectively hydrogenated, semi-crystalline block copolymer has a 100% modulus from 1 MPa to 15 MPa as measured by ASTM D 412. In some embodiments, the selectively hydrogenated, semi-crystalline block copolymer has an elongation at break of at least 300%. In some embodiments, the selectively hydrogenated, semi-crystalline block copolymer has an elongation at break ranging from 300% to 2000% as measured by ASTM D 412. In some embodiments, the selectively hydrogenated, semi-crystalline block copolymer has a tensile strength of at least 6 MPa as measured according to ASTM D 412. In some embodiments, the selectively hydrogenated, semi-crystalline block copolymer has a tensile strength ranging from 6 MPa to 40 MPa as measured according to ASTM D 412. In some embodiments, the selectively hydrogenated, semi-crystalline block copolymer has a tensile strength ranging from 10 MPa to 30 MPa, measured according to ASTM D 412. In some embodiments, the selectively hydrogenated, semi-crystalline block copolymer has a degree of swelling in toluene of less than 150 wt. % after 8 hours of immersions. In some embodiments, the selectively hydrogenated, semi-crystalline block copolymer exhibited a degree of swelling in toluene from 25 wt. % to 150 wt. % after 8 hours of immersion wherein wt. % is based upon the total wt. % of the block copolymer. In some embodiments, the selectively hydrogenated, semi-crystalline block copolymer exhibited a degree of swelling in toluene from 1 wt. % to 150 wt. % after 8 hours of immersion wherein wt. % is based upon the total wt. % of the lock copolymer. In some embodiments, the selectively hydrogenated, semi-crystalline block copolymer had a degree of swelling in paraffinic oil of less than 40 wt. % after two weeks of immersion. In some embodiments, the selectively hydrogenated, semi-crystalline block copolymer exhibited a degree of swelling in paraffinic oil ranging from 1 wt. % to 40 wt. % after two weeks of immersion wherein wt. % is based upon the total wt. % of the block copolymer. In some embodiments, the selectively hydrogenated, semi-crystalline block copolymer had a degree of swelling in cyclohexane of less than 150 wt. % after 8 hours of immersion. In some embodiments, the selectively hydrogenated, semi-crystalline block copolymer showed a degree of swelling in cyclohexane from 25 wt. % to 150 wt. % after 8 hours of immersion wherein wt. % is based upon the total wt. % of the block copolymer. In some embodiments, the block copolymer exhibited a degree of swelling in paraffinic oil from 1 wt. % to 40 wt. % after 8 hours of immersion wt. % is based upon the total wt. % of the block copolymer.

As used herein, the term "molecular weights" refers to the apparent molecular weight in kg/mol of the polymer or block of the copolymer. The molecular weights referred to in this specification and claims can be measured with gel permeation chromatography (GPC) using polystyrene calibration standards, such as is done according to ASTM D5296. GPC is a well-known method wherein polymers are separated according to molecular size, the largest molecule eluting first. The chromatograph is calibrated using commercially available polystyrene molecular weight standards.

The molecular weight of copolymers measured using GPC so calibrated are styrene equivalent molecular weights and are referred to as apparent molecular weights. The apparent molecular weights differ from the absolute or true molecular weight when the composition of the polymer eluting through the GPC columns is different in composition from polystyrene. However, comparison to model polymers allows conversion from apparent molecular weight to true or absolute molecular weight when necessary. The detection method used is preferably a combination of ultraviolet and refractive index detectors. The molecular weights expressed herein are measured at the peak of the GPC trace, and are commonly referred to as "peak molecular weights" (Mp).

Importantly, the features of the copolymers presented herein are achieved in the absence of chemical crosslinking agents such as peroxides or photo-initiators. Further, the polymers are not crosslinked by radiation such as is commonly done using electron beams. The block copolymers as presented herein are free of crosslinking agents and are not crosslinked.

In another embodiment, the selectively hydrogenated, semicrystalline block copolymers incorporate polar functional groups after being grafted with maleic anhydride. The grafting reaction is performed after polymerization and hydrogenation and can be done by any method known in the art. Such methods may be performed in solution or in the melt state. The preferred method is melt extrusion reaction. The preferred monomers to be grafted onto the block copolymers are maleic anhydride, maleic acid, fumaric acid, and their derivatives. A further description of functionalizing such block copolymers is disclosed in Gergen et al, U.S. Pat. No. 4,578,429 and in U.S. Pat. No. 5,506,299. The selectively hydrogenated block copolymer presented herein may be functionalized by grafting silicon or boron containing compounds to the polymer as disclosed in U.S. Pat. No. 4,882,384 as well as vinyl silane compounds. In still another manner, the block copolymer presented herein may be contacted with an alkoxy-silane compound to form silane-modified block copolymer. In yet another manner, the block copolymer of the present disclosure may be functionalized by grafting at least one ethylene oxide molecule to the polymer as disclosed in U.S. Pat. No. 4,898,914, or by reacting the polymer with carbon dioxide as disclosed in U.S. Pat. No. 4,970,265. Still further, the block copolymers of the present disclosure may be metallated as disclosed in U.S. Pat. Nos. 5,206,300 and 5,276,101, wherein the polymer is contacted with an alkali metal alkyl, such as a lithium alkyl. And still further, the block copolymers of the present disclosure may be functionalized by grafting sulfonic groups to the polymer as disclosed in U.S. Pat. No. 5,516,831.

In a further embodiment the compositions are made comprising the selectively hydrogenated, semi-crystalline block copolymers. The compositions include the block copolymer and at least one other component. The amount of selectively hydrogenated, semi-crystalline block copolymer ranges from 2 to 98% in the compositions. The additional component can be a thermoplastic resin, a tackifier, a plasticizer, and waxes. Exemplary thermoplastic resins may include polyolefins, copolyester elastomers, thermoplastic elastomers, polystyrene, styrene copolymers, and poly(phenylene ether). The additional polyolefins may preferably include polyethylene, polypropylene, and ethylene/alpha-olefin and propylene/alpha-olefin copolymers. The additional thermoplastic elastomers may preferably include styrenic block copolymers, both unsaturated and hydrogenated, thermoplastic polyurethanes, and copolyester elastomers. Styrene copolymers comprise high impact polystyrene (HIPS).

In some embodiments, a composition comprising the selectively hydrogenated, semi-crystalline block copolymers may have a modulus 100% ranging from 1.5 to 15 MPa, as measured according to ASTM D 412; a tensile strength ranging from 6 to 35 MPa, as measured according to ASTM D 412; a degree of swelling in toluene after 8 hours of immersion ranging from 1 wt. % to 150 wt. %. In some embodiments, the amount of composition recovered after toluene immersion and drying is greater than 95 wt. %, based on the original mass of the composition immersed in toluene. In some embodiments, the amount of composition recovered after toluene immersion and drying is greater than 98 wt. %, based on the original mass of the composition immersed in toluene.

Representative polyethylenes include, for example, but are not limited to, substantially linear ethylene polymers, homogeneously branched linear ethylene polymers, heterogeneously branched linear ethylene polymers, including linear low density polyethylene (LLDPE), ultra or very low density polyethylene (ULDPE or VLDPE), medium density polyethylene (MDPE), high density polyethylene (HDPE) and high pressure low density polyethylene (LDPE). When the thermoplastic polymer is polyethylene, the melt flow rate, also referred to as melt flow index, must be at least 0.1 g/10 min at 190° C. and 2.16 kg weight according to ASTM D1238. The preferred type of polyethylene is low density polyethylene with a melt flow rate of greater than 1 g/10 min (190° C./2.16 kg).

Representative polypropylenes include, for example, but are not limited to, substantially isotactic propylene homopolymers, random alpha olefin/propylene copolymers where propylene is the major component on a molar basis and polypropylene impact copolymers where the polymer matrix is primarily a polypropylene homopolymer or random copolymer and the rubber phase is an alpha-olefin/propylene random copolymer. Suitable melt flow rates of polypropylenes are at least 1 g/10 min at 230° C. and 2.16 kg according to ASTM D1238. More preferred are melt flow rates of at least 2 g/10 min Most preferred are melt flow rates of at least 3 g/10 min Polypropylene homopolymers are the preferred type of polypropylene.

Examples of ethylene/alpha-olefin copolymers and propylene/alpha-olefin copolymers include, but are not limited to, AFFINITY, ENGAGE and VERSIFY polymers from Dow Chemical and EXACT and VISTAMAXX polymers from Exxon Mobil. Suitable melt flow rates of such copolymers must be at least 1 g/10 min at 230° C. and 2.16 kg weight according to ASTM D1238. Preferred melt flow rates are at least 2 g/10 min and most preferred are melt flow rates of at least 3 g/10 min.

Copolyester elastomers (COPE) include, for example, copolymers of poly(butylene terephthalate) hard segments and soft segments composed of polyesters or polyethers, such as polytetramethylene ether glycol. Examples of suitable copolyester elastomers include Arnitel® resins available from DSM, Hytrel® resins available available from DuPont, Eastar® resins available from Eastman Chemical, and Dynapol® resins available from Evonik.

Suitable tackifiers may be selected from the group of compatible $C_5$, $C_9$ or $C_5/C_9$ hydrocarbon resins, hydrogenated or partially hydrogenated $C_5$ or $C_9$ hydrocarbon resins, or styrenated $C_5$ or $C_9$ resins. Additionally, suitable tackifiers include terpenes, styrenated terpene resins, fully hydrogenated or partially hydrogenated terpene resins, rosin esters, rosin derivatives and mixtures thereof. Suitable commercially available tackifying resins may include Piccotac 1095-N, which is an aliphatic resin or Piccotac 8590 which is an aliphatic/aromatic resin. Also suitable are the commercially available hydrocarbon tackifying resins of the Regalrez™ series such as Regalrez™ 1018, Regalrez™ 1085 or Regalrez™ 6108 and other resins sold under the trademarks "Regalite", "Escorez", "Wingtack", and "Arkon".

Additional auxiliary components may include one or more plasticizers. Suitable plasticizers include plasticizing oils such as paraffinic or naphthenic in character. Products such as these are available from Shell Oil Company under the trademark SHELLFLEX®, also under the trademark CATENEX™ and EDELEX™ and ONDINA® and Drake oils. EDELEX® N956 is set forth in the Examples. Unlike block copolymers deriving their strength from the physical crosslinking of polystyrene domains, the polymers can be plasticized with esters such as dioctyl-phthalate (DOP) and the like without degradation of the polymer's strength.

Additional components may include one or more stabilizers, such as an antioxidant. The antioxidants can be used either as a primary antioxidant such as hindered phenols or secondary antioxidants such as phosphite derivatives, or blends thereof. Acceptable stabilizers are Irganox® 565, 1010, 1076, or 1726 or Irgafos® 168, all by BASF, or Sumilizer® GS or T-PD from Sumitomo, or Ethanox 330 from Albemare.

The incorporation of inorganic fillers can be important in the end use applications of the block copolymer and their compositions. In particular, fillers are important to increase the mass and density of articles intended as vibration damping compositions. The nature and amount of the inorganic fillers present in the damping composition have an important effect on the extent of damping and on how vibration propagation is affected by temperature and frequency. Different morphologies of inorganic filler can be used. For example, fillers having a platelet form or those having a non-platelet form can be used. Examples of inorganic fillers in platelet form are mica, talc, flaked aluminum, flaked lead, and graphite. Mica has been found to be particularly effective. Various non-platelet fillers may be employed, for example, clay, calcium carbonate, barytes (barium sulfate), silica and iron powder. A synergistic effect can be realized between the platelet and non-platelet fillers. Some of the fillers, such as $Mg(OH)_2$ and $Al(OH)_3$ may impart flame retardant properties to the composition. The total amount of filler employed can be high. As the amount increases the damping improves. The upper limit in filler content is determined by the required physical and mechanical properties of the final composition, such as, flexibility, tear strength and moldability.

Blowing agents may be incorporated into the composition when foaming is desired. Examples of such blowing agents are physical or chemical blowing agents. Physical blowing agents comprise gases (e.g. $N_2$, $CO_2$) and liquids (e.g. water, pentane). Chemical blowing agents are exothermic and endothermic blowing agents. They decompose above a certain temperature, thereby releasing gas such as nitrogen, carbon dioxide or water, which causes a volume increase of the reaction mass. Chemical or physical blowing agents are usually used in combination with nucleating agents. Of the physical blowing agents, Carbon dioxide as well as nitrogen are preferred blowing agents.

Of the chemical blowing agents, the preferred blowing agent is Hydrocerol™ BIH40 (which then also acts as nucleating agent). These blowing agents are used in amounts of from 0.5 to 10 wt. %, relative to the weight of the total composition.

Slip agents may be a component of the composition presented herein and enhance the processability of the compound and reduce its stickiness. Suitable slip agents include low molecular weight amides, metallic stearates such as calcium and zinc stearates and the like, silicones, fluorinated hydrocarbons, acrylics and silicones, waxes and the like. Examples of suitable primary amides are behanamide (available as Crodamide BR from Croda, and ARMOSLIP® B from Akzo Nobel), erucamide (available as Crodamide E from Croda, ARMOSLIP E from Akzo Nobel, and ATMER® SA 1753 from Uniqema), oleamide (available as Crodamide VRX from Croda, ARMOSLIP CP from Akzo Nobel, and ATMER SA 1758 from Uniqema), and stearamide (available as Crodamide SR from Croda, ARMOSLIP 18 LF from Akzo Nobel, and ATMER SA 1750 from Uniqema). Examples of suitable secondary amines are oleyl palitamide (available as Crodamide 203 from Croda) and stearyl erucamide (available as Crodamide 212 from Croda). Both saturated and unsaturated amides are suitable.

The selectively hydrogenated, semi-crystalline block copolymers presented herein are useful in a broad range of articles. Such articles may comprise the neat polymer or may comprise compounds of the polymer such as described herein. The articles may be either solvent or melt cast films, coextruded multilayer films, melt blown films, melt blown multilayer films, an injection molded piece, cast or sprayed coatings, strands, powders, gels of various shapes, fibers, bicomponent fibers or multi-component fibers, melt-blown fibers, fibrous mats or bundles, foamed shapes, extruded tubes, injection molded articles, slush and rotationally molded pieces, extruded profiles of various shapes, and the like.

EXAMPLES

For the purposes of the present disclosure, the term "melt flow rate" is a measure of the melt flow of the polymer according ASTM D1238 at 230° C. and 2.16 kg weight or 190° C. and 2.16 kg or as otherwise specified. It is expressed in units of grams of polymer passing through a melt rheometer orifice in 10 minutes.

The tack (stickiness) measurements were made using 2 mm compression molded plates. The tack test was done by placing two compression molded plates in contact for 24 hours at room temperature under a weight of 1.2 kg. The plates were then manual separated and their tack or stickiness evaluated by qualitative observation. When not sticky the plates freely separate. When the plates were sticky then a measurable force was required to separate the plates.

Hardness was measured at 10 seconds on a stack of 3 compression molded plates, each 2 mm in thickness and are reported as Shore A hardness according to ASTMD2240.

The tensile tests were conducted according to ISO37 using type 2 dumbbells cut from 2 mm thick compression molded plates or from ASTM D412 D type dumbbells prepared by melt cast films of thin compression molded films.

The hysteresis tests were conducted using type 2 dumbbells cut from 2 mm thick compression molded plates. The dumbbells were clamped at a fixed distance of 50 mm in a tensile testing device. The samples were elongated at 500 mm/min to reach 100 elongation (i.e., clamp distance of 100 mm) and then immediately relaxed to zero force at 500 mm/min. The residual deformation at zero force was set after the first cycle. The second cycle was initiated immediately after completion of the first cycle at the same extension rates. A total of 5 cycles were performed.

Solvent resistance was measured by immersing 2 mm thick compression molded specimens in a solvent such as but not limited to toluene at room temperature for a specific time. The weight of the sample was determined before immersion, immediately after immersion, and in some cases as indicated after complete drying.

The optical properties of transmittance and haze were measured using ASTM D1003.

Example 1

All of the polymers were prepared by batch, anionic polymerization in cyclohexane solvent. Polymers of the present disclosure were polymerized by first synthesizing the A block. Purified, dried cyclohexane solvent was added to a closed, nitrogen flushed batch reactor. Further purification of the solvent was done by titration of butyl lithium or by addition an amount of sec-butyl lithium to the initiation amount which corresponded to the expected amount of impurity. The amount of butyl lithium then required to initiate polymerization was added to the stirred cyclohexane. An amount of butadiene sufficient to achieve a specific molecular weight target was then added to the reactor. Polymerization of the butadiene to form the A block was conducted at a temperature in the range of 40 to 70° C. for a time sufficient to consume essentially all of the butadiene monomer. Polymerization of controlled distribution B blocks was then conducted according to the methods disclosed in U.S. Pat. No. 7,169,848. Living arms so polymerized were then coupled by addition of an equivalent amount of coupling agent. Unless otherwise noted, the coupling agent was methyl-trimethoxy-silane (MTMS). After coupling any remaining anions were terminated by addition of alcohol.

The block copolymer so polymerized was then hydrogenated in a pressure vessel using a cobalt octoate/triethyl aluminum catalyst and hydrogen gas. The temperature of the hydrogenation was controlled such that the temperature remained above 50° C. Once the target hydrogenation level was achieved the reaction was terminated and the resulting selectively hydrogenated polymer was washed with hot acidic water to remove residual catalyst. The block copolymer was then isolated by coagulation in hot water and then dried.

Polymer 1 was a radial block copolymer having the structure $(A-B)_nX$. It was a primarily linear block copolymer having 87 wt. % linear $(A-B)_2X$ structure, 8 wt. % uncoupled A-B or one-armed block copolymer, 4 wt. % three-armed radial block copolymer, and 1 wt. % four-armed radial block copolymer. As such, it had an average arm number ($n_{ave}$) of 1.99. The apparent peak molecular weight (MWA) of the A block was 28.5 kg/mol and it had a vinyl content (VCA) of 8.1%. The B block was a controlled distribution copolymer block of styrene and butadiene and had an apparent peak molecular weight (MWB) of 60 kg/mol before coupling, it had a vinyl content (VCB) of 36.5%, a styrene content (PSCB) of 26.5 wt. %, and a blockiness of 9.7. The B block had been capped with approximately 9 repeat units of butadiene prior to coupling. The conjugated diene monomer units in both the A block and the controlled distribution block B were selectively hydrogenated such that greater than 99 mol % of the conjugated diene units were hydrogenated. The polymer 1 had a total mono vinyl aromatic content of 22 wt. % and a melting point characterized by a peak temperature of 102° C. and a heat of fusion ($\Delta H_f$) of 19 J/g. The mono vinyl aromatic units were not hydrogenated to any measurable degree. The ODT of Polymer 1 was less than 150° C.

Polymer 2 was a radial block copolymer having the structure $(A-B)_nX$ and had a resulting $n_{ave}$ of 2.14. A was a hydrogenated polybutadiene block, and B was a selectively hydrogenated controlled distribution block of copolymerized styrene and 1,3-butadiene. The B block had been capped with approximately 9 repeat units of butadiene prior to coupling. The molecular weight of the A block was 28.3 kg/mol, it had a vinyl content of 8.6 mol %, and its mass (MA) comprised 28 wt. % of the entire block copolymer. The controlled distribution block B had a vinyl content of 36 mol %, a styrene content of 29 wt. %, and a blockiness of 5.9%. The conjugated diene monomer units in both the A block and the controlled distribution block were selectively hydrogenated such that greater than 98 mol % of the conjugated diene units were hydrogenated. The mono vinyl aromatic units were not hydrogenated to any measurable degree. Polymer 2 had a total mono vinyl aromatic content of 21.2 wt. % and a melting point characterized by a peak temperature of 101° C. The ODT of Polymer 2 was less than 150° C.

Polymer 3 was a radial block copolymer having the structure $(A-B)_nX$ and had a resulting $n_{ave}$ of 1.99. The molecular weight of the A block was 28.7 kg/mol and it had a vinyl content of 9%. The molecular weight of the controlled distribution block B was 66 kg/mol before coupling, it had a vinyl content of 34%, a styrene content of 30% wt., and a blockiness of 1.6%. The B block had been capped with approximately 9 repeat units of butadiene prior to coupling. The conjugated diene monomer units in both the A block and the controlled distribution block were selectively hydrogenated such that greater than 99 mol % of the conjugated diene units were hydrogenated. The mono vinyl aromatic units were not hydrogenated to any measurable degree. Polymer 3 had a total mono vinyl aromatic content of 21.2 wt. % and melting point characterized by a peak temperature of 100° C. and a heat of fusion ($\Delta H_f$) of 26 J/g. Polymer 3 had a melt flow rate (MFR) of 5.7 g/10 min (230° C./2.16 kg). The ODT of Polymer 3 was less than 150° C.

Polymer 4 was a radial block copolymer having the structure $(A-B)_nX$ and had a resulting $n_{ave}$ of 1.96. A was a hydrogenated polybutadiene block and the B block was a selectively hydrogenated controlled distribution block of copolymerized styrene and 1,3-butadiene. The B block had been capped with approximately 18 repeat units of butadiene prior to coupling. The molecular weight of the A block was 46 kg/mol, it had a vinyl content of 8.1 mol %, and it comprised 40 wt. % of the entire block copolymer. The controlled distribution block B had a vinyl content of 60 mol %, a styrene content of 36.6 wt. %, and a blockiness of 9%. The conjugated diene monomer units in both the A block and the controlled distribution block were selectively hydrogenated such that greater than 98 mol % of the conjugated diene units were hydrogenated. The mono vinyl aromatic units were not hydrogenated to any measurable degree. Polymer 4 had a total mono vinyl aromatic content of 21 wt. % and a melting point characterized by a peak temperature of 102° C. and a heat of fusion ($\Delta H_f$) of 26.8 J/g. Polymer 4 had a melt flow rate (MFR) of 1.9 g/10 min (230° C./2.16 kg). The ODT of Polymer 4 was less than 150° C.

Polymer 5 was a radial block copolymer having the structure $(A-B)_nX$ and had a resulting $n_{ave}$ of 2.64. A was a hydrogenated polybutadiene block and the B block was a selectively hydrogenated controlled distribution block of copolymerized styrene and 1,3-butadiene. The B block had been capped with approximately 18 repeat units of butadiene prior to coupling. The molecular weight of the A block was 21.9 kg/mol, it had a vinyl content of 9 mol %, and it comprised 26 wt. % of the entire block copolymer. The controlled distribution block B had a vinyl content of 38 mol %, a styrene content of 30 wt. %, and a blockiness of 3.6. The conjugated diene monomer units in both the A block and the controlled distribution block were selectively hydrogenated such that greater than 99 mol % of the conjugated diene units were hydrogenated. The mono vinyl aromatic units were not hydrogenated to any measurable degree. Polymer 5 had a total mono vinyl aromatic content of 22 wt. % and a melting point characterized by a peak temperature of 101° C. and a heat of fusion ($\Delta H_f$) of 21.8 J/g. Polymer 5 had melt flow rates (MFR) of 2.7 g/10 min (190° C./2.16 kg) and 6.6 g/10 min (230° C./2.16 kg). The ODT of Polymer 5 was less than 150° C.

Polymer 6 was a radial block copolymer having the structure $(A-B-e/b)_n X$ and had a resulting $n_{ave}$ of 1.97. A was a hydrogenated polybutadiene block and B was a selectively hydrogenated, controlled distribution block of copolymerized styrene and 1,3-butadiene. The B block had been capped with approximately 18 repeat units of butadiene prior to coupling. The molecular weight of the A block was 24.3 kg/mol, it had a vinyl content of 8.6 mol %, and it comprised 30 wt. % of the entire block copolymer. The controlled distribution block B had a vinyl content of 70 mol %, a styrene content of 32 wt. %, and a blockiness of 9.5. The conjugated diene monomer units in both the A block and the controlled distribution block B were selectively hydrogenated such that greater than 99 mol % of the conjugated diene units were hydrogenated. The mono vinyl aromatic units were not hydrogenated to any measurable degree. Polymer 6 had a total mono vinyl aromatic content of 22 wt. % and a melting point characterized by a peak temperature of 102° C. and a heat of fusion ($\Delta H_f$) of 21.5 J/g. Polymer 6 had melt flow rates (MFR) of 19 g/10 min (190° C./2.16 kg) and 46 g/10 min (230° C./2.16 kg). The ODT of Polymer 6 was less than 150° C.

Polymer 7 was a radial block copolymer having the structure $(A-B)_n X$ and had a resulting $n_{ave}$ of 2.12. A was a hydrogenated polybutadiene block and B was a selectively hydrogenated controlled distribution block of copolymerized styrene and 1,3-butadiene. The B block had been capped with approximately 18 repeat units of butadiene prior to coupling. The molecular weight of the A block was 35.2 kg/mol, it had a vinyl content of approximately 9 mol %, and it comprised 28 wt. % of the entire block copolymer. The controlled distribution block B had a vinyl content of 35 mol %, a styrene content of 32 wt. %, and a blockiness of 1%. The conjugated diene monomer units in both the A block and the controlled distribution block were selectively hydrogenated such that 90 mol % of the conjugated diene units were hydrogenated. The mono vinyl aromatic units were not hydrogenated to any measurable degree. Polymer 7 had a total mono vinyl aromatic content of 23 wt. % and a melting point characterized by a peak temperature of 99° C. and a heat of fusion ($\Delta H_f$) of 25.4 J/g. Polymer 7 had a melt flow rate (MFR) of 1.7 g/10 min (230° C./2.16 kg). The ODT of Polymer 7 was less than 150° C.

Polymer 8 was a radial block copolymer having the structure $(A-B-eb)_n X$ and has a resulting $n_{ave}$ of 1.93. A was a hydrogenated polybutadiene block, B was a selectively hydrogenated controlled distribution block of copolymerized styrene and 1,3-butadiene, and eb was a relatively large hydrogenated polybutadiene segment with 36% vinyl and represented 19.1% of the total block copolymer. The molecular weight of the A block was 24.1 kg/mol, it had a vinyl content of approximately 9 mol %, and it comprised 26.7 wt. % of the entire block copolymer. The controlled distribution block B had a vinyl content of 36 mol %, a styrene content of 29.5 wt. %, and a blockiness of 1%. The conjugated diene monomer units in the A block, the B controlled distribution block and eb block were selectively hydrogenated such that greater than 99 mol % of the conjugated diene units were hydrogenated. The mono vinyl aromatic units were not hydrogenated to any measurable degree. Polymer 8 had a total mono vinyl aromatic content of 16 wt. % and a melting point characterized by a peak temperature of 102° C. and a heat of fusion ($\Delta H_f$) of 24.5 J/g. Polymer 8 had a melt flow rate (MFR) of 5 g/10 min (230° C./2.16 kg). The ODT of Polymer 8 was less than 150° C.

Polymer 9 was a radial block copolymer having the structure $(A-B)_n X$ and had a resulting $n_{ave}$ of 2.33. A was a hydrogenated polybutadiene block and B was a selectively hydrogenated controlled distribution block of copolymerized styrene and 1,3-butadiene. The B block had been capped with approximately 18 repeat units of butadiene prior to coupling. The molecular weight of the A block was 31 kg/mol, it had a vinyl content of approximately 10 mol %, and it comprised 36 wt. % of the entire block copolymer. The controlled distribution block B had a vinyl content of 40 mol %, a styrene content of 32 wt. %, and a blockiness of 3.6%. The conjugated diene monomer units in both the A block and the controlled distribution block were selectively hydrogenated such that greater than 99 mol % of the conjugated diene units were hydrogenated. The mono vinyl aromatic units were not hydrogenated to any measurable degree. Polymer 9 had a total mono vinyl aromatic content of 20 wt. % and a melting point characterized by a peak temperature of 99° C. and a heat of fusion ($\Delta H_f$) of 20 J/g. Polymer 9 had a melt flow rate (MFR) of 10 g/10 min (230° C./2.16 kg). The ODT of Polymer 7 was less than 150° C.

Polymer 10 was a controlled distribution block copolymer having no semi-crystalline blocks. It was a linear polymer having the structure $(PS-B)_n X$ (the n=2 species made up the majority of the material). PS was a polystyrene block and B was a selectively hydrogenated controlled distribution block of copolymerized styrene and 1,3-butadiene. The B block had been capped with approximately 18 repeat units of butadiene prior to coupling. The PS blocks comprised 21 wt. % of the entire block copolymer. The controlled distribution block had a polystyrene content of 26 wt. %, and 38% vinyl content. The butadiene monomer units have been hydrogenated to a level greater than 99 mol %. Polymer 10 had a total mono vinyl aromatic content of 42 wt % and no melting above 50° C. was observed during DSC analysis. It had a MFR of 0.8 g/10 min (230° C./2.16 kg). The ODT of Polymer 10 was greater than 250° C.

Polymer 11 was a hydrogenated conjugated diene block copolymer having polymerized conjugated diene blocks of differing vinyl content and a structure represented by $(A-B)_n X$ and had a resulting $n_{ave}$ of 2.04. Before hydrogenation the A block was a polymerized block of polybutadiene having a vinyl content of 9.3 mol %, a molecular weight of 28.5 kg/mol, and comprised 30 wt. % of the entire block copolymer. Before hydrogenation the B block was a polymerized block of polybutadiene having a vinyl content of 49 mol %. Polymer 11 had a total mono vinyl aromatic content of 0 wt. % and a melting point characterized by a peak temperature of 99° C. and a heat of fusion ($\Delta H_f$) of 11 J/g. It had a melt flow rate (MFR) of 8.4 g/10 min (230° C./2.16 kg). The ODT of Polymer 11 was less than 150° C.

Polymer 12 was a radial block copolymer having the structure (A-B)$_n$X and had a resulting n$_{ave}$ of 2.0. A was a hydrogenated polybutadiene block and B was a selectively hydrogenated controlled distribution block of copolymerized styrene and 1,3-butadiene. The B block had been capped with approximately 18 repeat units of butadiene prior to coupling. The molecular weight of the A block was 14 kg/mol, it had a vinyl content of 9 mol %, and it comprised 23 wt. % of the entire block copolymer. The controlled distribution block B had a vinyl content of 60 mol %, a styrene content of 31 wt. %, and a blockiness of 2.9%. The conjugated diene monomer units in both the A block and the controlled distribution block were selectively hydrogenated such that greater than 99 mol % of the conjugated diene units were hydrogenated. The mono vinyl aromatic units were not hydrogenated to any measurable degree. Polymer 12 had a total mono vinyl aromatic content of 23 wt. % and a melting point characterized by a peak temperature of 102° C. and a heat of fusion ($\Delta H_f$) of 22.1 J/g. It had melt flow rates (MFR) of 68 g/10 min (190° C./2.16 kg) and 163 g/10 min (230° C./2.16 kg). The ODT of Polymer 12 was less than 150° C.

Polymer 13 was a radial block copolymer having the structure (A-B-$_n$X and has a resulting n$_{ave}$ of 2.43. A was a hydrogenated polybutadiene block, B was a selectively hydrogenated controlled distribution block of copolymerized styrene and 1,3-butadiene. The B block had been capped with approximately 18 repeat units of butadiene prior to coupling. The molecular weight of the A block was 14.9 kg/mol, it had a vinyl content of approximately 9 mol %, and it comprised 19 wt. % of the entire block copolymer. The controlled distribution block B had a vinyl content of 37 mol %, a styrene content of 8 wt. %, and a blockiness of 1%. The conjugated diene monomer units in both the A block and the controlled distribution block had been selectively hydrogenated such that 98 mol % of the conjugated diene units were hydrogenated. The mono vinyl aromatic units were not hydrogenated to any measurable degree. Polymer 13 had a total mono vinyl aromatic content of 6 wt. % and a melting point characterized by a peak temperature of 99° C. and a heat of fusion ($\Delta H_f$) of 20.3 J/g. It had a melt flow rate (MFR) of 10 g/10 min (230° C./2.16 kg). The ODT of Polymer 13 was less than 150° C.

Polymer 14 was the non-hydrogenated precursor of Polymer 3. It was not selectively hydrogenated and did not exhibit any melting or crystallization behavior.

The structural characteristics of the polymers are summarized in Table 1.

Example 2

The melting behavior of Polymer 3 presented herein was characterized using differential scanning calorimetry (DSC). This was compared to that of Polymer 10. The presence of semi-crystalline blocks in Polymer 3 was clearly demonstrated by the melting point whose peak was at 98° C. and the corresponding crystallization peak at 72° C. In contrast, no significant crystallinity was seen in Polymer 10. The DSC curves for these two materials are compared in FIG. 1.

Example 3

Samples of the polymers were prepared by compression molding and then tested for their physical properties. Compression molded plates 2 mm in thickness were by molding at a temperature of 200° C. and at a pressure and time sufficient to produce defect-free plates. The physical properties and chemical resistance properties of the neat polymers are listed in Table 2.

This example shows the importance of the presence of a semi-crystalline block. When there is no semi-crystalline block the polymer dissolves. For instance, Polymer 10 is a styrenic block copolymer having only homopolystyrene endblocks and a non-crystalline, controlled distribution rubber block of styrene and butadiene. While having measurable tensile properties before exposure to solvent, its lack of crystallinity led to complete dissolution in cyclohexane and in toluene. Likewise, Polymer 14 lacked crystallinity because its butadiene blocks were not hydrogenated. It also dissolved in cyclohexane and in toluene.

Polymers 3 and 4 presented herein showed superior solvent resistance and superior resistance to oil swelling. The oil was a paraffinic oil (Primol® 352 from ExxonMobil). They each possessed a semi-crystalline block and melting points of 100° C. and 101° C., respectively. Polymer 11 did possess a semi-crystalline block with a Tm of 101° C. However, the rubber block was a relatively high vinyl butadiene block with no mono vinyl aromatic content and therefore possessed a lessened driving force for phase separation. The resulting degree of swelling in paraffinic oil was relatively high.

Example 4

Samples of the polymers were prepared by compression molding and then tested for their physical properties. The polymers were melt homogenized in a small Brabender internal mixer (40 g loading) with 0.2% wt. Irgafos 168 at 200° C., at 100 rpm for 5 minutes. Compression molding into 2 mm plates was carried out at 220° C. (15 minutes at 20 kN followed by 5 minutes at 100 kN) and samples were cooled under pressure. The physical properties and chemical resistance properties of the neat polymers are listed in Table 3.

Polymer 5 and Polymer 6 were block copolymers having semi-crystalline A blocks. These polymers had crystalline melting points of 101° C. and 102° C., respectively, and had excellent resistance to swelling in toluene and paraffinic oil. In particular, these examples demonstrate a breadth of vinyl content in the B blocks. The vinyl contents of Polymer 5 and Polymer 6 were 38 mol % and 70 mol %, respectively. Polymer 12 was also a semi-crystalline block copolymer having a controlled distribution B block and having an elevated vinyl content of 60 mol % wherein mol % was based on the total monomer content of the B block. However, the semi-crystalline A block had a relatively low molecular weight at 14 kg/mol as compared to that of Polymer 5 (21.9 kg/mol) and Polymer 6 (24.3 kg/mol). Polymer 12 did not withstand immersion in toluene and dissolved.

Example 5

Neat Polymer Properties in Melt Cast Films Samples of the polymers were prepared casting films using melt extrusion and then tested for their physical properties. Melt cast films were prepared using a Davis-Standard/Killion extruder having a single screw 1 inch in diameter and 30 inches long. A 12 inch wide coat hanger design die was used. The physical properties of the neat polymers are listed in Table 4.

Polymers 7, 8 and 9 presented herein were easily cast by melt extrusion and had high modulus, low set and high elasticity as represented by high elongation at break and high recovered energy. Of particular note is Polymer 7 which had a total diene hydrogenation level of only 90%. Polymer 13 was a block copolymer having a controlled distribution rubber block B and semi-crystalline A blocks. However, the combination of low molecular weight of the A block (14.9 kg/mol) and low amount of mono vinyl aromatic in the B block (6 wt. %) yielded a material with deficient tensile strength.

Example 6

Drawn films were prepared by extrusion melt casting. A Goettfert single screw extruder was used to melt and convey the polymer and the draw ratio was affected by controlling the off-take rate of the cast film. When the single screw extrusion of the cast film was well established and operating at steady state, the off-take speed corresponding to the melt speed at the cast film die was measured and set as stretching ratio 1. The imposed off-take speed of the extruded film was then increased in steps. Increased film off-take speeds were imposed to reach stretching ratios of 1, 3.5, 7 and 27. The polymers exhibited excellent drawability in the melt as indicated by the high draw ratios achieved. The polymers presented herein, when subjected to moderate to high draw ratios exhibited high isotropy and excellent hysteresis at 100%. Superior tensile properties were achieved after drawing as indicated by the increased tensile strength with increased draw ratio.

Table 5 lists the melt extrusion conditions and the resulting measured physical properties. Polymer 3 exhibited excellent drawability in the melt as indicated by the high draw ratio achieved. It also exhibits high isotropy as indicated by comparison of the tensile strength and tensile modulus results measured in the machine direction (MD), or direction of drawing, and in the transverse direction (TD), or direction perpendicular to drawing. The polymers also exhibited excellent hysteresis at 100%. Of particular note is the ratio of polymer properties (MD/TD) which demonstrate the exceptional isotropy achieved by this processing method.

Films were also prepared at a draw ratio of 27. Continuous films were produced at this condition without experiencing breakage of the film. However, with the equipment employed the films experienced oscillating behavior at the die and as such produced films whose properties could not be compared with the films prepared at draw ratios of 1, 3.5 and 7.

Example 7

Compounds were made by blending Polymer 2 with LDPE (Dow 621L) at various ratios using a Brabender internal mixer operating at 220° C. Test pieces were prepared by compression molding 2 mm thick plates from the blended composition. The resulting properties are listed in Table 6.

Neat LDPE (i.e., 0 wt. % Polymer 2) had deficient optical properties: high haze and low transmittance. Compounds containing up to 30 wt. % Polymer 2 exhibited a combination of improved optical and tensile properties. The compositions of the present disclosure including the semi-crystalline block copolymer and LDPE thus exhibited a high and surprising degree of compatibility. Incompatible blends would necessarily possess a degradation of both optical and mechanical properties.

Example 8

Compounds were made by blending Polymer 3 and LDPE (LD 105, MFR 2.0 g/10 min (190° C./2.16 kg), from ExxonMobil). Pre-blends were first made by dry blending pellets of Polymer 3 and the LDPE. Melt cast films were then prepared from this dry blend using a Davis-Standard/Killion extruder having a single screw 1 inch in diameter and 30 inches long. A 12 inch wide coat hanger design die was used. Tensile and tensile hysteresis properties were measured on melt cast films in the machine direction (MD) and in the transverse direction (TD, i.e., perpendicular to MD). The results are listed in Table 7. As in the compression molded plates, these melt cast films of the compounds exhibited a high degree of compatibility and excellent mechanical properties.

Example 9

Compounds were made by blending polymers with Arnitel® EM400 at a weight ratio of 50/50. Arnitel EM400 is a copolyester thermoplastic elastomer having a melt flow of 33 cm$^3$/10 min (230° C./2.16 kg) available from DSM. Compounds of the experimental polymers with Arnitel EM400 in 50/50 ratio (with 0.2% wt. Irganox 1010 and 0.2% wt. Irgafos 168) were produced in a Brabender internal mixer (40 g loading) at 200° C. with a rotor speed of 100 rpm for 6 minutes. Compression molding into 2 mm plates was carried out at 220° C. (15 minutes at 20 kN followed by 5 minutes at 100 kN) and samples were cooled under pressure. The resulting properties are listed in Table 8.

The compounds demonstrated excellent flow with superior tensile strength, superior resistance to dissolution in toluene and to oil swelling. Of particular note was the recovery of material after toluene immersion. The compounds retained greater than 98 wt. % of their original mass. In contrast, the composition prepared with Polymer 10 showed a retention of only 60 wt. %, corresponding to 80% dissolution of the block copolymer component since the copolyester component was not soluble in toluene.

Example 10

Compounds were made by blending the polymers described herein with a polypropylene resin (PP BI995, MFR=100, from Samsung Total), a polyolefin elastomer (Vistamaxx VM6202, MFR=9.1 g/10 min (190° C./2.16 kg), from ExxonMobil), and a HDPE resin (M60200, MFR=20 g/10 min (190° C./2.16 kg), from Reliance Polymers). HSBC$_1$ was a selectively hydrogenated styrenic block copolymer having the structure S-EB-S where S was a homopolystyrene block having a peak molecular weight of 28 kg/mol and EB was a selectively hydrogenated homopolybutadiene block having a vinyl content of 69 mol %. The total styrene content of HSBC$_1$ was 33 wt. %. The blending was done using twin screw extruder operated with a barrel temperature of 170° C. at the entrance, 230° C. in the mixing zone, and 190° C. at the die. The extruded strands were pelletized. Test pieces were prepared by injection molding at 230° C. to prepare 2 mm and 1.2 mm thick plates. The extraction tests were conducted according to GB4806: 80° C., n-hexane reflux for 30 min, 2 ml hexane/cm$^2$ of sample. The resulting properties are listed in Table 9.

The compounds of the present disclosure showed superior flow and resistance to n-hexane extraction even in reflux conditions. In contrast, the compound prepared with HSBC₁, a non-crystalline styrenic block copolymer, exhibited excessive extraction by hexane indicating deficient solvent resistance.

The present disclosure provides a selectively hydrogenated, semi-crystalline block copolymer, compounds made with such block copolymer, and articles made from such block copolymer that fully satisfies the objects, aims, and advantages set forth above. While some exemplary embodiments have been described herein, it is evident that many alternatives, modifications, and variations are possible in light of the foregoing disclosure. Accordingly it is intended to embrace all such alternatives, modifications and variations as fall within the spirit and broad scope of the appended claims.

TABLE 1

| Sample | Structure | $n_{ave}$ | $MW_A$ (kg/mol) | $VC_A$ (%) | $M_A$ (%) | $MW_B$ (kg/mol) | $VC_B$ (%) | $PSC_B$ (wt. %) | Blockiness (%) |
|---|---|---|---|---|---|---|---|---|---|
| Polymer 1 | (A-B)ₙX | 1.99 | 28.5 | 8.1 | — | 60 | 36.5 | 26.5 | 9.7 |
| Polymer 2 | (A-B)ₙX | 2.14 | 28.3 | 8.6 | 28 | — | 36 | 29 | 5.9 |
| Polymer 3 | (A-B)ₙX | 1.99 | 28.7 | 9 | — | 66 | 34 | 30 | 1.6 |
| Polymer 4 | (A-B)ₙX | 1.96 | 46 | 8.1 | 40 | — | 60 | 36.6 | 9 |
| Polymer 5 | (A-B)ₙX | 2.64 | 21.9 | 9 | 26 | — | 38 | 30 | 3.6 |
| Polymer 6 | (A-B)ₙX | 1.97 | 24.3 | 8.6 | 30 | — | 70 | 32 | 9.5 |
| Polymer 7 | (A-B)ₙX | 2.12 | 35.2 | 9 | 28 | — | 35 | 32 | 1 |
| Polymer 8 | (A-B-eb)ₙX | 1.93 | 24.1 | 9 | 26.7 | — | 36 | 29.5 | 1 |
| Polymer 9 | (A-B)ₙX | 2.33 | 31 | 10 | 36 | — | 40 | 32 | 3.6 |
| Polymer 10 | (PS-B)ₙX | 1.98 | 11 | N/A | 21 | — | 38 | 26 | 57 |
| Polymer 11 | (A-EB)ₙX | 2.04 | 28.5 | 9.3 | 30 | — | 49 | 0 | N/A |
| Polymer 12 | (A-B)ₙX | 2.0 | 14 | 9 | 23 | — | 60 | 31 | 2.9 |
| Polymer 13 | (A-B)ₙX | 2.43 | 14.9 | 9 | 19 | — | 37 | 8 | 1 |

TABLE 2

| | | Polymer 4 | Polymer 3 | Polymer 14 | Polymer 10 | Polymer 11 |
|---|---|---|---|---|---|---|
| Hardness (3 * 2 mm) | Shore A | 78 | 67 | | 69 | 67 |
| Swell in Cyclohexane | % (8 hr) | 80 | 124 | Dissolved | Dissolved | 160 |
| Insoluble in Cyclohexane | % | >99 | >98 | | 0 | >99 |
| Swell in Toluene | % (8 hr) | 100 | 135 | Dissolved | Dissolved | 130 |
| Swell in par. Oil | % (½ week) | 7/10 | 15/25 | | | 35/55 |

TABLE 3

| | Units | Polymer 6 | Polymer 5 | Polymer 12 |
|---|---|---|---|---|
| Swell in Toluene | % (8 hr) | 120 | 90 | Dissolved |
| Swell in par. Oil | % (2 week) | 21 | 22 | |
| Hardness (3*2 mm) | Shore A | 63 | 68 | 61 |
| TS | MPa | 5.7 | 11 | 4.5 |
| Mod100% | MPa | 2 | 2.7 | 2 |
| Elongation at Break | % | 665 | 690 | 320 |
| Hysteresis set after1 cycle at 100% | % | 7 | 8 | 6 |

TABLE 4

| Polymer | | Polymer 9 | Polymer 7 | Polymer 8 | Polymer 13 |
|---|---|---|---|---|---|
| Tensile Strength | MPa | 22 | 32 | 26 | 11 |
| Modulus 100% | MPa | 3.5 | 2.9 | 3.6 | 2.4 |
| Elongation at Break | % | 640 | 780 | 660 | 770 |
| Hysteresis set After 1 cycle at 100% | % | 6 | 7 | 7 | 7 |
| Hysteresis recovered energy after 1 cycle at 100% | % | 76 | 91 | 76 | 65 |

TABLE 5

|  | Units | Film 1 | | | Film 2 | | | Film 3 | | |
| --- | --- | --- | --- | --- | --- | --- | --- | --- | --- | --- |
| Cast film production conditions | | Un-stretched | | | Stretched | | | Stretched | | |
| Extruder exit temperature settings | ° C. | 205 | | | 205 | | | 205 | | |
| Die pressure | bar | 97 | | | 97 | | | 97 | | |
| Take-off speed | m/min | 0.6 | | | 2 | | | 4 | | |
| draw ratio | | 1 | | | 3.5 | | | 7 | | |
| Properties on extruded cast film | | | | | | | | | | |
| Direction of measurement | | MD | TD | MD/TD | MD | TD | MD/TD | MD | TD | MD/TD |
| Film thickness | μm | 420 | 413 | | 130 | 130 | | 96 | 71 | |
| Tensile properties on 15 mm wide strips (ASTM882) | | | | | | | | | | |
| Modulus 100% | MPa | 2.9 | 2.9 | 1.00 | 3.1 | 3 | 1.03 | 3 | 3.7 | 0.81 |
| Modulus 300% | MPa | 5.4 | 5.5 | 0.98 | 6 | 5.9 | 1.02 | 6.1 | 8.8 | 0.69 |
| Modulus 500% | MPa | 8.5 | 8.8 | 0.97 | 12.2 | 11.7 | 1.04 | 14.7 | N.M. | N.M. |
| Tensile strength | MPa | 12.5 | 13.2 | 0.93 | 22 | 20.2 | 1.09 | 24 | 26.3 | 0.91 |
| Elongation at break | % | 660 | 660 | 1.00 | 560 | 560 | 1.00 | 540 | 430 | 1.26 |
| Hysteresis 100% (1 cycle) | % | 7.4 | 8.1 | 0.91 | 5.6 | 5.5 | 1.02 | 6.9 | N.M. | N.M. |
| Hysteresis 100% (total of 5 cycles) | % | 10.2 | 11 | 0.93 | 7.9 | 7.2 | 1.10 | 7.9 | N.M. | N.M. |
| Hysteresis 300% (1 cycle) | % | 34 | 37 | 0.92 | 45 | 37 | 1.22 | 53 | 38 | 1.40 |
| Hysteresis 300% (total of 5 cycles) | % | 43 | 45 | 0.96 | 56 | 48 | 1.17 | 69 | 48 | 1.44 |
| Additional set from the last 4 cycles | % | 9 | 8 | 1.12 | 11 | 11 | 1.00 | 13 | 10 | 1.30 |

N.M. means "not measured"

TABLE 6

| Mixture compositions | | | | | |
| --- | --- | --- | --- | --- | --- |
| Polymer 2 | % w | 100 | 30 | 10 | 0 |
| LDPE | % w | 0 | 70 | 90 | 100 |
| Compression molded plates properties | | | | | |
| Plate thickness | mm | 2 | 2 | 2 | 2 |
| 100% Modulus | MPa | 2.7 | 7.7 | 8.6 | 9.7 |
| 300% Modulus | MPa | 6 | 10.2 | 11.3 | 12.1 |
| Ultimate Stress | MPa | 22 | 19.5 | 14.7 | 18.9 |
| Ultimate Strain | % | 850 | 600 | 430 | 480 |
| Transmittance | % | 93 | 93.3 | 93.2 | 91.5 |
| Haze | % | 17 | 28.7 | 33 | 39.4 |

TABLE 7

| | Polymer 3 | | Polymer 3 w/10 wt. % LDPE | | Polymer 3 w/20 wt. % LDPE | |
| --- | --- | --- | --- | --- | --- | --- |
| Properties/Cast Film | MD | TD | MD | TD | MD | TD |
| Tensile Values | | | | | | |
| 100% Modulus, psi | 490 | 480 | 520 | 470 | 680 | 620 |
| 300% Modulus, psi | 1010 | 1000 | 1050 | 940 | 1200 | 1100 |

TABLE 7-continued

|  | Polymer 3 | | Polymer 3 w/10 wt. % LDPE | | Polymer 3 w/20 wt. % LDPE | |
|---|---|---|---|---|---|---|
| Properties/Cast Film | MD | TD | MD | TD | MD | TD |
| 500% Modulus, psi | 1790 | 1800 | 1900 | 1700 | 2200 | 2100 |
| Ultimate Stress, psi | 3100 | 3100 | 3600 | 2900 | 3700 | 2900 |
| Ultimate Strain, % | 620 | 610 | 630 | 610 | 600 | 570 |
| Hysteresis Values (300%) | | | | | | |
| Cycle 1 Tensile Set % | 28 | 29 | 33 | 34 | 81 | 73 |
| Cycle 1 Recovered Energy, % | 58 | 58 | 54 | 55 | 32 | 37 |
| Cycle 2 Tensile Set, % | 32 | 32 | 38 | 38 | 89 | 81 |
| Cycle 2 Recovered Energy, % | 79 | 79 | 77 | 78 | 64 | 69 |
| Hysteresis Values (100%) | | | | | | |
| Cycle 1 Tensile Set, % | 5.4 | 5.8 | 5.7 | 6.5 | 8.7 | 8.6 |
| Cycle 1 Energy Rec., % | 81 | 81 | 79 | 78 | 64 | 67 |
| Cycle 2 Tensile Set, % | 6.1 | 6.5 | 6.5 | 7.4 | 10.3 | 10 |
| Cycle 2 Energy Rec., % | 91 | 91 | 90 | 89 | 80 | 83 |

TABLE 8

| Composition | | | | | |
|---|---|---|---|---|---|
| Polymer 1 | % wt. of plastic | 50 | | | |
| Polymer 4 | % wt. of plastic | | 50 | | |
| Polymer 11 | % wt. of plastic | | | 50 | |
| Polymer 10 | % wt. of plastic | | | | 50 |
| Arnitel EM400 | % wt. of plastic | 50 | 50 | 50 | 50 |
| Irganox 1010 | % wt. of plastic | 0.2 | 0.2 | 0.2 | 0.2 |
| Irgafos168 | % wt. of plastic | 0.2 | 0.2 | 0.2 | 0.2 |
| Properties | | | | | |
| Melt flow rate (230° C./2.16 kg) | dg/min | 38 | 18 | 22 | 16 |
| Properties on 2 mm compression molded plates | | | | | |
| Hardness 10 s (3*2 mm) | Shore A | 82 | 83 | 76 | 81 |
| Tensile properties (dumbbell) | | | | | |
| Modulus 50% | MPa | 4.0 | 4.3 | 3.0 | 4.2 |
| Modulus 100% | MPa | 5.3 | 5.5 | 3.6 | 5.2 |
| Modulus 300% | MPa | N.M. | 9.3 | N.M. | N.M. |
| Tensile strength | MPa | 6.8 | 13.8 | 4.0 | 7.5 |
| Elongation at break | % | 200 | 450 | 200 | 220 |
| Chemical resistance | | | | | |
| Swell in toluene (8 hrs) | % wt. | 120 | 100 | 130 | 90 |
| Recovered after drying | % wt. | >98 | >98 | >98 | 60 |
| Swell in paraffinic oil (1/2 weeks) | % wt. | 7/10 | 5/7 | 20/28 | 10/14 |

N.M. means "not measured".

TABLE 9

| Composition | | | | |
|---|---|---|---|---|
| Polymer 3 | parts | 20 | 30 | 0 |
| HSBC 1 | parts | | | 20 |
| Polypropylene | parts | 12 | 10 | 12 |
| Polyolefin Elastomer | parts | 53 | 45 | 53 |
| HDPE | parts | 15 | 15 | 15 |
| Irganox 1010 | parts | 0.1 | 0.1 | 0.1 |
| Iragafos 168 | parts | 0.2 | 0.2 | 0.2 |
| Total | parts | 100.3 | 100.3 | 100.3 |
| Mixing with twin screw extruder at 170-230° C. Properties | | | | |
| MFR (190° C./2.16 kg) | g/10 min | 8.8 | 8.0 | 4.4 |
| Properties on 2 mm injection molded plates | | | | |
| Hardness | Shore A, 10 s | 88 | 84 | 83 |
| Properties on 1.2 mm injection molded plates | | | | |
| n-hexane extraction | mg/L | 718 | 727 | 1312 |

The invention claimed is:

1. A selectively hydrogenated, semi-crystalline block copolymer consisting of at least one A block and at least one B block,
    wherein the block copolymer has a structure of A-B, $(A-B)_nX$, $(A-B)_nX-(A)_m$, or $(A-B)_nX-(B)_m$ wherein n is from 2 to 10, m is from 1 to 10 and X is a coupling agent residue,
    wherein the A block is a hydrogenated block of polymerized 1,3-butadiene having a vinyl content of 20 mol % or less, and the B block is a copolymer block of conjugated diene and mono vinyl aromatic monomer units,
    wherein the vinyl aromatic monomer units are derived from mono vinyl aromatic monomers selected from the group consisting of styrene, methylstyrene, p-tert-butylstyrene, dimethylstyrene, alpha-methylstyrene, diphenyl ethylenes, and combinations thereof;
    wherein the total amount of mono vinyl aromatic monomer in the block copolymer is from 10 to 55 wt. %; and
    wherein the A block has a melting point in the range of 50° C. to 120° C. and a molecular weight from greater than 15 kg/mol to 80 kg/mol.

2. The selectively hydrogenated, semi-crystalline block copolymer of claim 1 wherein the B block is a controlled distribution copolymer block of conjugated diene and mono vinyl aromatic monomer units wherein
    i. the polymerized conjugated diene monomer units are hydrogenated;

ii. the amount of polymerized mono vinyl aromatic is between about 10 wt % and about 55 wt.; and iii. the mono vinyl aromatic blockiness is less than 40%.

3. The selectively hydrogenated, semi-crystalline block copolymer of claim 1 wherein the B block is a random copolymer block having a weight ratio of conjugated diene to mono vinyl aromatic monomer units from 90/10 to 60/40.

4. The selectively hydrogenated, semi-crystalline block copolymer of claim 1 wherein the vinyl content of the conjugated diene units in the B block is from 30 to 90 mol %.

5. The selectively hydrogenated, semi-crystalline block copolymer of claim 1 wherein the polymerized 1,3-butadiene in the A block is hydrogenated to a level of 90 mol % or greater.

6. The selectively hydrogenated, semi-crystalline block copolymer of claim 1 wherein the conjugated diene monomer units of the B block are hydrogenated to a level of 90 mol % or greater.

7. The selectively hydrogenated, semi-crystalline block copolymer of claim 1 wherein the mono vinyl aromatic monomer units of the B block are hydrogenated to a level of less than 10 mol %.

8. The selectively hydrogenated, semi-crystalline block copolymer of claim 1 wherein the molecular weight of the A block is from 22 kg/mol to 50 kg/mol.

9. The selectively hydrogenated, semi-crystalline block copolymer of claim 1 wherein the molecular weight of the B block is from 20 kg/mol to 200 kg/mol.

10. The selectively hydrogenated, semi-crystalline block copolymer of claim 1, wherein the copolymer has an order-disorder transition temperature of 150° C. or lower.

11. The selectively hydrogenated, semi-crystalline block copolymer of claim 1, wherein the copolymer has a tensile strength of at least 6 MPa.

12. The selectively hydrogenated, semi-crystalline block copolymer of claim 1, wherein the copolymer has an elongation at break of at least 300%.

13. The selectively hydrogenated, semi-crystalline block copolymer of claim 1, wherein the copolymer has a tensile strength of 6 MPa or greater and a degree of swelling in toluene after 8 hours immersion of less than 150 wt. %.

14. The selectively hydrogenated, semi-crystalline block copolymer of claim 1, wherein the copolymer exhibited a degree of swelling in cyclohexane after 8 hours immersion of less than 150 wt. %.

15. The selectively hydrogenated, semi-crystalline block copolymer of claim 1, wherein the copolymer has a degree of swelling in paraffinic oil after immersion for 2 weeks of less than 40 wt. %.

16. The selectively hydrogenated, semi-crystalline block copolymer of claim 1, wherein the copolymer is free of chemical cross-links.

17. A composition comprising the selectively hydrogenated, semi-crystalline block copolymer of claim 1 and at least one component selected from the group consisting of thermoplastic resins, tackifiers, plasticizers, and waxes.

18. The composition of claim 17 wherein the selectively hydrogenated, semi-crystalline block copolymer comprises from 2 to 98 wt. % of the composition.

19. An article comprising the selectively hydrogenated, semi-crystalline block copolymer of claim 1 which is a melt extruded or solvent cast film, coextruded multilayer films, melt blown films, melt blown multilayer films, an injection molded piece, a coating, a foamed shape, a fiber, a bicomponent, a multi-component fiber, a melt-blown fiber, a fibrous mat, a bundle of fibers, a powder, a gel of various shapes, extruded tubes, extruded profiles, injection molded pieces, a slush molded piece, or a rotationally molded piece.

20. A method for preparing a drawn film of the selectively hydrogenated, semi-crystalline block copolymer of claim 1, the method comprising:

a. melt extruding a film of the block copolymer at an extrusion rate, b. stretching the extruded film by drawing the film at a draw rate greater than the extrusion rate, and c. cooling the stretched film to room temperature to form the drawn film.

21. The method of claim 20, wherein the drawn film has a ratio of tensile strength in a machine direction to transverse direction of less than 1.1.

22. The method of claim 20, wherein the drawn film has a ratio of elastic modulus in a machine direction to transverse direction at elongations of up to 500% of less than 1.05.

23. The method of claim 20, wherein a ratio of the draw rate to the extrusion rate is from 1.0 to 30.

* * * * *